Patented Apr. 30, 1940

2,198,774

UNITED STATES PATENT OFFICE 2,198,774

GUANIDINE XANTHATE

Alphons O. Jaeger, Greenwich, Conn., and Richard Herrlinger, Bridgeville, Pa., assignors to American Cyanamid & Chemical Corporation, New York, N. Y., a corporation of Delaware No Drawing. Application June 24, 1939,
Serial No. 280,970

5 Claims. (Cl. 260—455)

This invention relates to guanidine xanthates and to methods of preparing the same. The invention includes the guanidine xanthates themselves, which are new chemical compounds, their methods of preparation, and processes employing them.

We have found that guanidine xanthates of the formula

$H_2N.C(:NH)NH.S.CS.OAlk$ can be prepared as light yellow solids which are soluble in water and have many interesting properties. For example, they are good flotation agents, particularly for the froth flotation of sulfide ores such as galena, zinc sulfide and the like. They are also good unhairing accelerators for the unhairing of hides and skins, as described in our copending application Ser. No. 211,182, filed June 1, 1938. They can also be used in stripping silver from photographic developing solutions.

In the above formula the designation Alk represents an alkyl radical which may be a primary, secondary or even a tertiary alkyl radical. Thus, for example, Alk may be methyl, ethyl, n-propyl, primary butyl, secondary butyl, tertiary butyl or higher alkyl radicals such as are known to be combined in alkali metal xanthates. It will thus be seen that the invention in its broader aspects includes, as new chemical compounds, guanidine xanthates containing any suitable alkyl group. Further examples of such groups are illustrated in our copending application above referred to.

The guanidine xanthates may be prepared by reacting guanidine carbonate or other similar guanidine salts with a mixture of carbon bisulfide and an alcohol containing the desired alkyl group such as methyl alcohol, ethyl alcohol, propyl alcohol, butyl alcohol and the like, the reaction being preferably carried out in the presence of barium hydroxide or a similar water-soluble inorganic salt capable of combining with the acid radical of the guanidine salt used. Thus, for example, if guanidine sulfate were used, barium hydroxide could also be employed.

The guanidine xanthates can also be prepared by conversion of the corresponding alkali metal xanthates with guanidine salts, and this method is frequently preferable from a commercial standpoint as the alkali metal xanthates are cheaply and easily prepared by known methods. The conversion is preferably carried out by reacting a guanidine salt with an alkali metal xanthate in a non-aqueous solvent, such as an alcohol, and filtering off the inorganic salt produced. The guanidine xanthate is obtained by this process in the form of a solution in an organic solvent, which solution may be directly used for some purposes or the solid xanthate may be obtained by evaporating off the solvent or by precipitating with a non-solvent diluent.

The invention will be further illustrated by the following specific example to which, however, it is not limited. It should be understood that although this example may show some of the more specific details of the invention it is given primarily for purposes of illustration and the invention in its broader aspects is not limited thereto.

Example 14.4 parts of sodium ethyl xanthate were dissolved in absolute alcohol and 10 parts of a solution of guanidine hydrochloride in absolute alcohol were added with stirring. Sodium chloride was precipitated and was filtered off, and the filtrate was evaporated to dryness under a vacuum.

The solid residue, which melted at 107–8° C., was redissolved in hot alcohol and reprecipitated by filtering into five volumes of cold ether. The purified guanidine ethyl xanthate was light yellow in color and melted at 111–112° C.

This application is a continuation-in-part of our copending application Serial No. 211,182, filed June 1, 1938, now Patent No. 2,169,147.

What we claim is:

1. A guanidine xanthate.
2. Guanidine ethyl xanthate.
3. A method of preparing a guanidine xanthate which comprises bringing about metathesis between an alkali metal xanthate and a guanidine salt in an organic solvent.
4. A method of preparing guanidine ethyl xanthate which comprises bringing about metathesis between an alkali metal ethyl xanthate and a guanidine salt in anhydrous ethyl alcohol.
5. A method of preparing a guanidine xanthate which comprises reacting a guanidine salt with carbon bisulfide and an aliphatic alcohol in the presence of a hydroxide of a metal capable of forming an insoluble precipitate with the anion of the guanidine salt.

ALPHONS O. JAEGER.
RICHARD HERRLINGER.